RE 25322
April 11, 1961　　　C. GREENFIELD　　　2,979,408
DEHYDRATION OF FLUID FATTY MIXTURES
Filed Oct. 24, 1956
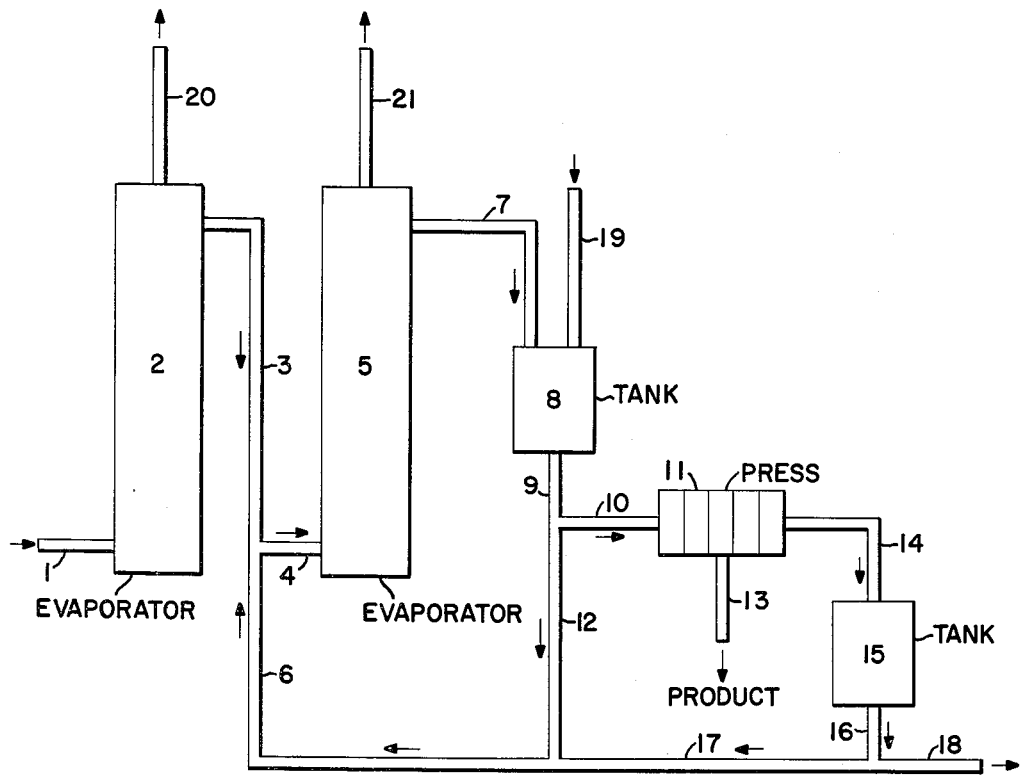

United States Patent Office 2,979,408
Patented Apr. 11, 1961

2,979,408

DEHYDRATION OF FLUID FATTY MIXTURES

Charles Greenfield, 3 Templeton Arms, N. Broad St., Elizabeth, N.J.

Filed Oct. 24, 1956, Ser. No. 617,987

15 Claims. (Cl. 99—56)

This invention relates to improvements in the dehydration of a fluid system comprising a mixture of fat, non-fat solids and water. More particularly it relates to a process of the nature indicated wherein these mixtures, usually foods of natural origin, are dehydrated at comparatively low temperatures and pressures with the avoidance of gel formation by increasing the concentration of discrete non-fat solids in the system.

This application is a continuation-in-part of Serial Number 378,829, filed September 8, 1953, now abandoned, which in turn is a continuation-in-part of Serial Number 132,220, filed December 9, 1949, now U.S. Patent 2,651,647.

In U.S. Patent 2,651,647 it was pointed out that the dehydration of mixtures of fat, non-fat solids and water could be carried out at lower than usual temperatures by utilizing sub-atmospheric pressures and a fat liquid medium as a heat transfer agent. This operation permits of the recovery of products which have not deteriorated in taste, quality or other characteristics as compared to the original mixture being treated.

One problem in the described operation arises, however, in the formation of gels or gel like masses at some time during the dehydration. These gels are of varying viscosities and arise at different times during the dehydration of different mixtures depending apparently upon the particular fats, non-fat solids and concentrations in the system. In some cases the gel like masses are gluey, plastic-like agglomerates of particles which hinder fluidity of the system. The dehydration can be continued beyond the gel points, but this latter type operation is subject to certain difficulties, i.e., time of treatment may be overly prolonged and in the case of commercially available continuous evaporating equipment such as forced feed, falling and rising film tubular evaporator equipment, fouling of the tubes or other heating surfaces may occur making for a more difficult operation. Under these conditions, batch type operations as described in U.S. Patent 2,651,647 must often be utilized unless larger quantities of fat are provided as the fluid medium.

This invention provides an improved method of overcoming the before-mentioned difficulties. The invention comprises dehydrating a fluid system comprising a mixture of fat, non-fat solids and water by heating the system at sub-atmospheric pressures and preventing or minimizing the gel formation by increasing the concentration of discrete non-fat solids in the fluid system during the dehydration operation.

It is especially surprising to find that the desired result can be accomplished in the manner indicated, because in most cases of the mixtures being treated it is necessary to increase the concentration of fat to preserve the fluidity of the system, e.g., see U.S. Patent 2,651,647. Now it has been found that it is advantageous to also increase the concentration of the discrete non-fat solids so as to achieve the desired result and still also eliminate concomitant problems.

The mixtures being treated are thus conveniently fatty foods of usually natural origin or foods that become part of a component of a fatty product by fat addition. These may also be biochemicals or other materials that are either sensitive to heat or most efficiently dried by this technique and either are fatty in nature or become part of the product containing fat.

Some of the foods conveniently dried by this technique are milk, cream, ice cream, whole eggs, vanilla, egg yolks, egg whites, cake mixes, mayonnaise, frostings, puddings, soups, chocolate, yeast, etc.

Biologicals such as blood, hormones, liver extracts, etc. can be dried by this technique (using e.g. the food fatty acids such as oleic, linoleic and others as the fatty medium).

This invention can also be applied to the drying of materials ordinarily subject to deterioration because of high moisture content, where such materials are eventually mixed with fatty materials. Examples are animal and poultry feed dry mixes containing fat. The fat may be added as e.g. tallow such as available from the rendering industry. Flour of high moisture content (10%–12%) which is incorporated into cake mixes can be advantageously dried in this fashion.

The systems treated comprising principally the three components mentioned are heated while in the form of a fluid system. The term "fluid" is intended to be synonymous with "liquid," i.e., taking the shape of the container. This will thus also include heavy, viscous fluids which are pumpable. The solids in fat are of small particle size, e.g., as found naturally in liquid materials, such as milk. The components can thus be present in a suspension, a colloidal solution and/or a true solution, and are characterized by being subject during dehydration to the beforementioned gel formation.

The words "fats," "fatty," and the like refer to the natural glycerides, the free fatty acids thereof, and includes as well the unsaponifiable lipoid soluble concomitants of the natural fats and oils, such as the oil soluble vitamins, sterols, phospholipids, and other naturally occurring lipoid solubles. Derivatives of the foregoing as well as synthetic "fats" are also included.

As stated previously and as also disclosed in U.S. Patent 2,651,647, a fat liquid medium is used as a heat transfer agent to remove moisture at a lower than normal temperature so as to economically achieve certain advantages. The added fatty liquid medium can be the same kind of fat as that present in a natural fat-containing substance, or it can be another fat satisfactory for the operation. The fat selected as the fatty liquid medium can be chosen with the viewpoint of securing suitable antioxidant values, taste, odor, compatibility from the food viewpoint, etc.

In certain cases it can be advantageous to actually utilize a different satisfactory fat liquid medium than the one naturally found in the system so as to come up with a new food product, e.g., replacing cholesterol with a more desirable fat. The fat liquid media are characterized by being fluid under the conditions of treatment. These media can be added prior to the initiation of dehydration or after partial dehydration and both types of operation are included herein.

The quantity of the added satisfactory liquid medium normally required is such that the ratio of the fat in the original material plus the added fat liquid medium to the dry non-fat solids is in the range of a minimum of about two to one to twenty to one parts by weight, or higher. It should be noted that at higher temperatures and/or higher concentrations in some cases this ratio can be as low as one to one and is intended to be covered herein.

The non-fat solids typically found in the mixtures vary with the particular material, i.e., in whole milk the non-fat solids are casein, lactobulin, lactose minerals and vitamins. In cream they are largely the same as milk except in lesser quantity. In eggs, they are largely albumins; in cake mixes, they are largely flour, sucrose, skim milk, egg proteins, and in soups, they are largely vegetable proteins and meat proteins.

As stated previously, this gel formation is avoided by increasing the concentration of the discrete non-fat solids in the fluid system prior to said gel formation. This increased concentration can be obtained by the addition of discrete, extraneous, non-fat solids or can be produced in situ where solubility decreases with decreasing temperature, by cooling or refrigeration of at least a portion of the system being treated to form these discrete solids and maintaining or recycling them to the system under dehydration. These same means can be utilized to minimize gel formation once it has initiated, but normally it is preferable to avoid rather than cure the difficulty.

"Discrete solids" are defined as distinct particles which when further dried do not create gel formations. The "discrete solids" can be small but are generally greater than 5 to 10 microns. In any case they are larger than colloidal size and are generally visible to the eye or by microscopic examination in the fluid fatty mixture.

In the case of, e.g., milk, extraneous dry milk solids can be added to increase the "discrete solids" content at a concentration of about 60%. It is to be noted that there is a varying solubility and/or dispersion for milk solids with temperature and consequently a variation in the quantity of discrete solids produced. It can be shown that at concentrations of solids not fat equal to 70% or higher sufficient discrete solids are present to avoid gel formation at temperatures as high as 125° F. However, discrete solids can be formed by controlled cooling at considerably lower concentration of solids in the range of 50% when temperatures are reduced to approximately 80°–85° F. Variation in rate of drying and agitation contribute to varying concentration of solids not fat and water to form the necessary "discrete solids" to avoid gel formation.

Generally it is preferred to add sufficient solids so as to increase the total concentration of solids not fat considerably over what it was prior to such addition. For example, in case of milk where continuous operation through tubular evaporators is desired, considerable quantities of solids not fat are added so that the concentration of the solids not fat is rapidly changed, i.e., 50% solids not fat and 50% water to 90% solids not fat plus 10% water in a matter of seconds. Of course fat is recycled so that about a minimum of about 2 parts of fat is available to maintain fluidity in the system. It is to be noted that herein is a technique for rapidly converting a low concentration solids not fat substance to a high concentration solids not fat substance. This technique therefore becomes a valuable means of drying sensitive materials which tend to change during prolonged drying operations, such as milk, even at comparatively low temperatures. It is to be noted that this process has considerable advantage over the spray drying process for rapidly drying sensitive products because of (1) excellent fuel economy by use of multi-effect tubular evaporators, such as forced circulation, film type, ammonia low temperature, etc., and (2) improved quality of product by use of low temperatures and elimination of air in the system.

As noted above the range of non-fat solids concentration can be anywhere in the case of milk from about 50% to about 95% approximately and contain sufficient discrete solids to avoid gel formation.

As a corollary of the above paragraph no previous drying need be applied in many cases. For example, small quantities of fresh whole milk (not previously concentrated) can be directly added to a fluid mixture of substantially dried milk in liquid butter fat to rapidly increase solids concentration of said fresh whole milk and at the same time removing the moisture present in the fluid mixture.

The other extreme is to concentrate the milk solids to the maximum possible and add only the minimum possible solids to effect the discrete solids concentration desired.

It is therefore apparent that the amount of increase in the concentration of discrete non-fat solids is empiric, depending on any given system, conditions and equipment. A control technique is provided in any case for preventing the undesirable gel formation. Specific examples below elaborate on the specific technique of this invention.

An additional advantage is provided in this invention when the feed stream of non-fat solids and water is admixed with added fat and non-fat solids so that in the system undergoing dehydration the ratio of non-fat solids to water is at least about 9:1. This avoids undesirable product degradation which is often a problem, e.g., the browning reaction in food dehydration. An additional benefit is the improvement in heat transfer at this concentration.

Subsequent to the dehydration, the fat and non-fat solids can be separated from each other and in the case of whole milk, the non-fat solids can be separated as a solid block with the ratio of each subject to control through the utilization of separating devices, such as the Carver press. Thus with the fluid whole milk an end composition can be obtained having three to four parts fat and eight to nine parts of solids. These figures could be varied, however, depending upon the final outlet for the finished product, e.g., in some cases low fat milk products of from 1 to 2 parts fat to 9 parts of solids have utility.

The temperatures utilized are normally the lowest possible to secure economic drying and preserve the quality of the product and so as to avoid deterioration. Typical temperatures utilized are conveniently in the range of approximately 40° F. to 200° F. For milk and cream, temperatures in the range of 60° to 180° F. are conveniently employed. The subatmospheric pressures utilized are conveniently between the range of about 1 mm. Hg to about 400 mm. Hg depending on the material being treated.

This invention will be better understood by reference to the following examples and preferred embodiment as discussed in further detail in connection with the flow diagram shown in the drawing.

*Example 1.—Dehydration of fluid whole milk*

100 parts of pasteurized and homogenized fluid whole milk containing 9 parts non-fat solids, 3½ parts fat and 87½ parts of water is delivered through line 1 to continuous evaporator 2 where it is concentrated to approximately 50% total solids or 9 parts of non-fat solids, 3½ parts of butter fat and 12½ parts of water. The evaporator temperature of the concentrated milk is maintained at approximately 90° F. and at a vacuum of approximately 28″+.

The concentrated milk thereafter discharges from line 3 and is fed through line 4 to evaporator 5 where it joins a stream coming through line 6 containing 27 parts of non-fat solids, 176½ parts of butter fat and negligible water. The total stream entering evaporator 5 now contains 36 parts non-fat solids, 180 parts of butter fat and 12½ parts of water. The solid concentration is equal to 74.2% on a fat free basis. It is to be noted that discrete solids have been increased considerably since substantially all of the solids added through line 6 are now in discrete form, whereas in the original concentrated milk leaving evaporator 2 very few discrete particles are evident. It is to be further noted that the total fat to non-fat solids ratio is maintained at about 5 to 1. The vacuum in evaporator 5 is maintained at 13 mm. Hg and the temperature of the fluid mixture leaving evaporator 5 is approximately 95° F. Under these temperature and evaporator conditions considerable discrete solids exist and the moisture content is rapidly reduced to approximately 5% on a fat free basis without forming a gel. The contact time in passing through evaporator 5 is less than 5 minutes so as to avoid denaturing and/or insolubility of the milk particles. The water vapor is removed from evaporators 2 and 5 through lines 20 and 21.

The fluid mixture now leaving evaporator 5 through line 7 contains 36 parts of non-fat solids, 180 parts of butter fat and approximately 1.9 parts of water. The water content can be still further reduced by passing through another vacuum evaporator of the film type suitable for removing small quantities of moisture so that the milk solids are of marketable dryness specifications. The fluid mixture is thereafter delivered into a holding tank 8 where it is discharged through line 9 at the desired rate to lines 10 and 12. Part of the fluid mixture is recycled through line 12 and this stream consists of 27 parts of non-fat solids and 135 parts butter fat and negligible water. The balance of the fluid mixture passing through line 9 is conducted through line 10 to a hydraulic filter press 11 of the Carver type. This stream contains 9 parts of non-fat solids and 45 parts of butter fat and negligible water. Thereafter hydraulic pressure is exerted on the fluid mixture resulting in the separation of excess substantially clear fluid butter fat and dry blocks of solid milk product are ejected automatically from the hydraulic filter press 11. The solid milk cakes ejected from the press through chute 13 contain 9 parts of non-fat solids, 3½ parts of butter fat and negligible water and as can be noted is the composition of the original whole fluid milk except for water content. The temperature during the pressing operations is conveniently maintained at 95°–100° F. by means of a warm water jacket. 41½ parts of liquid butter fat discharge from press 11 through line 14 into storage tank 15. Thereafter the liquid butter fat flowing through lines 16 and 17 joins the stream at line 6 of dry solids and butter fat coming from line 12.

If it is desired to make dry milk cakes having lowered fat content such as 15% fat content, the pressure and holding time in the hydraulic press is increased so that the dry solid cakes of whole milk 13 discharge containing 9 parts of non-fat solids and 1.6 parts of butter fat. The excess 1.9 parts of butter fat from line 18 therefore become available for marketing or other processing operations.

27 parts of non-fat milk solids and 176½ parts of butter fat are conveniently added at 19 to tank 8 in order to start the process. The non-fat solids that are used should be of the highest quality possible and within a short time thereafter the non-fat solids circulating through the system are generated from the incoming milk.

In a continuous process for manufacturing dry milk solids, it is not necessary to recycle solids back to the evaporator since the circulating stream in a forced circulating type of evaporator, e.g. 5, can consist of a considerably greater solids concentration than what is to be fed to the evaporator from the primary concentrator.

For example, if 1000 lbs. of dry milk is to be produced/hour, milk is first concentrated to 50% so that 16.6 lbs. of water and 16.6 lbs. of total solids (consisting of 12 lbs. of non-fat solids and 4.6 lbs. of fat) are to be concentrated/min. This stream meets the circulating stream in evaporator 5 where 3000 lbs./min. is being pumped through the evaporating zone, consisting of 2500 lbs. of fat, 475 lbs. of solids and 25 lbs. of water.

The combined stream now consists of 487.0 lbs. of solids, 41.6 lbs. of water and 2500 lbs. fat, or approximately 93% solids on a fat free basis. At this concentration of solids, insolubility of solids is considerably minimized and as the drying is very rapid, e.g., less than 1 minute, insolubility is nil.

*Example 2.—Dehydration of cream*

Manufacture of dry cream from heavy cream is carried out in a similar manner as shown in Example 1 except that 100 parts of cream contains approximately 5 parts of non-fat solids, 40 parts of butter fat and 55 parts of water. The cream is concentrated to approximately 5 parts of non-fat solids, 40 parts of butter fat and 7 parts of water. 15 parts of non-fat solids and 120 parts of fat are recycled into evaporator 5 so that the entering mixture contains 20 parts of non-fat solids, 160 parts butter fat and 7 parts of water. The product leaving evaporator 5 contains approximately 20 parts non-fat solids and 160 parts of butter fat. No additional fat need be recycled to line 17.

15 parts of non-fat solids and 120 parts of butter fat are recycled to the evaporator 5 leaving 5 parts of non-fat solids and 40 parts of fat of the original mixture. Since appreciable quantities of fat remain in the final dried cream centrifuging can accomplish the desired separation. After centrifuging any desirable fat content dry cream can be obtained such as 5 parts non-fat solids and 10 parts fat. The balance of the butter fat, 30 parts, is available for other use such as the sale of butter oil of high quality. Since the maximum temperature has not exceeded 100° F. this product is of exceptional marketability.

The drying of cream as illustrated provides a means of recovering all of the constituents of the cream.

If hydraulic pressure had been applied, a cake of milk solids equivalent to whole milk could have been obtained, with additional butter oil for other uses or for sale.

*Example 3.—Dehydration of egg yolk*

Every hour 100 parts of egg yolk containing 49 parts of water, 18 parts of non-fat solids, 7.0 parts of lecithin and 26 parts of egg fat are mixed with 149 parts of fat melting at less than 95° F. so that a fluid mixture results.

This mixture is fed to continuous evaporator 2 (as shown in Example 1) and the mixture concentrated to 25 parts of water, 25 parts of non-fat solids plus lecithin and 175 parts of fat. (A fat to solids ratio of 7:1 is thus maintained.)

If the evaporator 5 is now a forced circulating type whereby a flow 250 parts of non-fat solids and 1500 parts of fat are circulating every hour and the water is evaporated at a rate of 23.75 parts/hour, the final mixture leaving evaporator 5 is 25 parts of non-fat solids plus lecithin, 175 parts of fat and 1.25 parts of water. The moisture may be further reduced by passing the mixture to a film type high vacuum evaporator. In the case of egg yolks it is preferably reduced to less than 3% on the non-fat solid basis. The balance of 149 parts of fat are separated by centrifuging or by use of a hydraulic press and returned to the process so that eggs containing the original fat content result. It is to be noted that within a short period of operation the original carrying fat is replaced by egg fat, so that shortly thereafter the dry egg yolks are essentially derived from the entering moisture containing yolks.

*Example 4.—Dehydration of whole eggs*

In a similar fashion whole eggs are satisfactorily dehydrated using the same fat to non-fat solids as given in Example 3 for preliminary evaporation and the same circulating stream containing the aforementioned solids and fat concentration. The excess fat is removed so as to produce dry egg solids of essentially the original composition.

If it is desired to remove egg lecithin, the supernatant fat is first removed by centrifugal or settling technique. The lecithin can thereafter be removed advantageously by filtration or other known techniques from the separated fat.

Example 5

Blood can be dried using fatty acids as the fatty liquid. A mixture of oleic and linoleic acids as prepared from linseed oil can be used for this purpose. Dried blood obtained from a preliminary vacuum freeze drying technique can be used to start the process. The percentage of fatty acids can be varied to leave a dry cake containing 20–25% fat. Any other constitutent of the blood may be handled in this fashion.

Example 6

Milk chocolate is effectively manufactured by using the technique described for milk processing, 100 parts of liquid whole milk containing 4 parts butter fat, 9 parts solids not fat and 87 parts of water is evaporated under vacuum as described previously, until the concentration has changed to approximately 4 parts of butter fat, 9 parts solids and 27 parts water. 246 parts of a mixture of butter fat and cocoa fat (ratio of approximately 1 part butter fat to 1 part cocoa fat) is added to the concentrated product to produce a liquid fatty mixture of 9 parts solids not fat, 250 parts fat and 27 parts water. The evaporation of water is continued under vacuum until the composition has changed to approximately 9 parts solids not fat 250 parts fat and 9 parts water. At this point 32 parts of dry sugar and 4 parts of dry cocoa are added (cocoa can be added as cocoa liquor is desired). Discrete particles are then found in the fatty liquid medium containing 45 parts solids not fat and 9 parts of water suspended in 250 parts of liquid fatty medium. The mixture is subjected to heat and vacuum and dried to the desired moisture content and gel formation avoided. The final drying is conducted at a temperature such that the "conching" operation can take place without destroying the flavor of the milk chocolate. This temperature is approximately 145° to 150° F. During this final stage, it is expedient to reduce the solid particle size by circulating the fat mixture through a fine grinder. The mixture can be separated into milk chocolate containing the desired fat content by delivery of the liquid fatty mixture to a suitable separating device, as for example a centrifuge or liquid classifier, and recycling the cocoa fat-butter fat mixture to the processing operations as previously described. Centrifugal equipment such as those having nozzle dischargers suitable for handling heavy sludges can be used to effect the separation of the plastic chocolate mass from the excess liquid fat.

Milk, cream, chocolate, whole eggs and egg yolk have thus actually been dehydrated by the process of this invention. Yeast has also similarly been dehydrated. This technique is particularly advantageous for yeast because the added fat used for dehydration can also be chosen so as to give a premium type formulation, e.g., cake mixes or with brewers dried yeast as a component of animal and poultry feeds.

Inorganics and organic materials other than those of natural origin can also be dried by this technique, such as:

(1) Pigments in drying oils used in the coatings industry.

(2) Lime slurry in mineral oil, where such mixture is further reacted with stearic acid to form calcium stearate and water. The water formed in the reaction may be dried using the same liquid mineral oil medium.

(3) Drying of esters in fatty acids such as, e.g. polybutylene glycols and thereafter reacting the glycols with fatty acid to produce diesters.

(4) Kaolin clay, phosphate earth slimes, calcium tungstate, etc. may be dried in a suitable oil and thereafter separated from the oil during further processing operations.

(5) Drying of soaps in fatty oils of either natural or synthetic variety.

The advantages of this invention will be apparent to the skilled in the art. Fatty mixtures are dehydrated to any desired degree, i.e., partly or completely, economically with the preservation of their quality in an economic manner with the avoidance of manufacturing difficulties and product deterioration.

It is to be understood that this invention is not limited to the specific examples and equipment which have been offered merely as illustrations and that modifications such as staging may be made without departing from the spirit of the invention.

What is claimed is:

1. In a process of dehydrating a fluid system comprising a mixture of fat, non-fat solids and water by heating the continuous fluid system at sub-atmospheric pressures, said system being normally characterized by gel-like formation at some point in the dehydration the improvement which comprises adding a fat liquid medium to the mixture so as to obtain a minimum ratio of total fat to non-fat solids of about 2 and increasing the concentration of discrete non-fat solids in the continuous fluid system undergoing the sub-atmospheric dehydration process and prior to normal gel formation whereby the gel formation is prevented.

2. The process of claim 1 in which non-fat solids are added to the system.

3. The process of claim 1 in which the concentration of non-fat solids is increased by cooling at least a portion of the liquid mixture undergoing dehydration so as to form discrete non-fat solids and then continuing the dehydration operation.

4. The process of claim 1 in which the ratio of non-fat solids to water after the concentration increase is at least about 9 : 1.

5. In a process of dehydrating a fluid system comprising a mixture of fat, non-fat solids and water, the minimum ratio of total fat to non-fat solids being about 2 : 1, by heating the continuous fluid system at sub-atmospheric pressures, said system being normally characterized by gel-like formation at some point in the dehydration, the improvement which comprises feeding a fluid stream of the non-fat solids and water into an evaporation zone, mixing the continuous feed stream fluid undergoing the sub-atmospheric dehydration and prior to normal gel formation with an additional fluid stream of fat and discrete non-fat solids so as to increase the concentration of non-fat solids in the combined streams over that in the feed streams whereby the gel-like formation is prevented.

6. The process of claim 5 in which the ratio of non-fat solids to water in the combined stream is at least about 9 : 1.

7. The process of claim 5 in which the fluid system being dehydrated is milk.

8. The process of claim 5 in which the fluid system being dehydrated is cream.

9. The process of claim 5 in which the fluid system being dehydrated is yeast.

10. The process of claim 5 in which the fluid system being dehydrated is egg.

11. A process of dehydrating fluid whole milk containing fat, non-fat solids and water which comprises the steps of heating the milk as a continuous system in a heating zone at sub-atmospheric pressures to partially dehydrate it; feeding the partially dehydrated milk to an additional heating zone wherein it is further heated as a continuous fluid system at sub-atmospheric pressure in the presence of an additional fluid mixture of fat and discrete non-fat solids to further dehydrate it and recovering the dehydrated whole milk product.

12. The process of claim 11 in which the temperatures of dehydration are in the range of about 60° to 180° F.

13. The process of claim 12 including the additional step of supplying the additional fluid mixture to the second heating zone by recycling.

14. Process for manufacturing milk chocolate comprising heating fluid whole milk under sub-atmospheric pressure to achieve a partial concentration thereof, adding butter fat and cocoa fat to said fluid partially concentrated whole milk to achieve a minimum ratio of total fat to non-fat solids of about 2 : 1, further heating said fluid mixture thus produced under sub-atmospheric pressure to a point before further heating thereof would result in the formation of a gel-like mass, then adding sugar and cocoa thereto and heating the resultant mixture as a continuous fluid heating system under sub-atmospheric pressure to obtain a dehydrated product, separating milk chocolate from said dehydrated product as a plastic mass from excess fat.

15. Process in accordance with claim 14 wherein the dehydrated mass, prior to the separation of the excess fat therefrom, is milled to increase the smoothness thereof.

References Cited in the file of this patent

UNITED STATES PATENTS

| | | |
|---|---|---|
| 694,100 | Hall | Feb. 25, 1902 |
| 2,126,807 | Peebles | Aug. 16, 1938 |
| 2,651,647 | Greenfield | Sept. 8, 1953 |
| 2,728,678 | Sharp | Dec. 27, 1955 |

OTHER REFERENCES

Herrington: Milk and Milk Processing, New York, 1948, page 264.